United States Patent [19]

Petruchik et al.

[11] Patent Number: 5,541,682
[45] Date of Patent: Jul. 30, 1996

[54] SEALING BAND FOR WATER-RESISTANT CAMERA HOUSING

[75] Inventors: Dwight J. Petruchik, Honeoye Falls; Kevin J. O'Leary, Rochester, both of N.Y.

[73] Assignee: Eastman Kodak Company, Rochester, N.Y.

[21] Appl. No.: 388,073

[22] Filed: Feb. 14, 1995

[51] Int. Cl.⁶ .......................... G03B 17/08; G03B 29/00
[52] U.S. Cl. ..................... 354/62; 354/64; 354/288
[58] Field of Search ............................. 354/64, 62, 288; D16/204

[56] References Cited

U.S. PATENT DOCUMENTS

| | | | |
|---|---|---|---|
| 3,831,182 | 8/1974 | Shimizu | 354/64 |
| 3,874,742 | 4/1975 | Smith | 354/64 |
| 4,375,323 | 3/1983 | Inagaki et al. | 354/64 |
| 5,325,139 | 6/1994 | Matsumoto | 354/64 |

FOREIGN PATENT DOCUMENTS

| | | |
|---|---|---|
| 3-54923 | 5/1991 | Japan . |
| 3-63130 | 6/1991 | Japan . |

*Primary Examiner*—D. Rutledge
*Attorney, Agent, or Firm*—Roger A. Fields

[57] ABSTRACT

A water-resistant camera housing comprises a pair of separable housing sections, and a waterproof sealing band covering a separation seam between the housing sections to provide a water-resistant seal for the seam. The sealing band has a pair of opposite end portions one of which overlaps the other but leaves a slight gap between them adjacent the seam. A waterproof filler occupies the gap to provide a water-resistant seal in the gap for the seam.

4 Claims, 2 Drawing Sheets

1

SEALING BAND FOR WATER-RESISTANT CAMERA HOUSING

CROSS-REFERENCE TO RELATED APPLICATION

Reference is made to commonly assigned copending application Ser. No. 08/383,072 entitled WATER-RESISTANT CAMERA HOUSING, and filed Feb. 14, 1995 in the name of Clark E. Harris.

FIELD OF THE INVENTION

The invention relates generally to the field of photography, and in particular to a water-resistant camera housing. More specifically, the invention relates to a waterproof sealing band for the water-resistant camera housing.

BACKGROUND OF THE INVENTION

The most widely used water-resistant camera housing for underwater photography essentially is a rigid transparent box.

As disclosed in prior art Japanese patent application No. 3-54923, published May 28, 1991, the transparent box may comprise a pair of separable box halves joined at a continuous seam which is in the shape of a rectangle. A continuous elastic band is arranged taut over the seam to provide a water-resistant seal along the seam.

A less costly sealing band is one which is non-continuous, that is it has a pair of opposite end portions. The sealing band might be secured to the box halves along the seam, and the end portions would be abutted end-to-end over the seam.

THE CROSS-REFERENCED APPLICATION

The cross-referenced application discloses a water-resistant camera housing comprising a pair of housing sections, and a waterproof sealing band covering a seam between the housing sections to provide a water-resistant seal for the seam. The pair of housing sections are joined at an integral flexible hinge in line with the seam to constitute a single-piece housing. The sealing band has a pair of opposite end portions that overlap one another adjacent the flexible hinge.

This is believed to provide a more effective seal as compared to the prior art example in which the opposite end portions of the sealing band are abutted end-to-end over the seam.

SUMMARY OF THE INVENTION

A water-resistant camera housing comprising a pair of separable housing sections, and a waterproof sealing band covering a separation seam between the housing sections to provide a water-resistant seal for the seam, is characterized in that:

the sealing band has a pair of opposite end portions one of which overlaps the other but leaves a slight gap between them adjacent the seam; and a waterproof filler occupies the gap to provide a water-resistant seal in the gap for the seam.

This is believed to provide a more effective seal as compared to the prior art example in which the opposite end portions of the sealing band are abutted end-to-end over the seam.

DETAILED DESCRIPTION OF THE INVENTION

The invention is disclosed as being embodied in a water-resistant housing for enclosing a camera. Because the features of a water-resistant housing for enclosing a camera are generally known, as exemplified by prior art U.S. Pat. Nos. Des. 321,704, issued Nov. 19, 1991, and No. 5,126,772, issued Jun. 30, 1992, the description which follows is directed in particular only to those elements forming part of or cooperating directly with the disclosed embodiment. It is to be understood, however, that other elements may take various forms known to a person of ordinary skill in the art.

Figure 1:
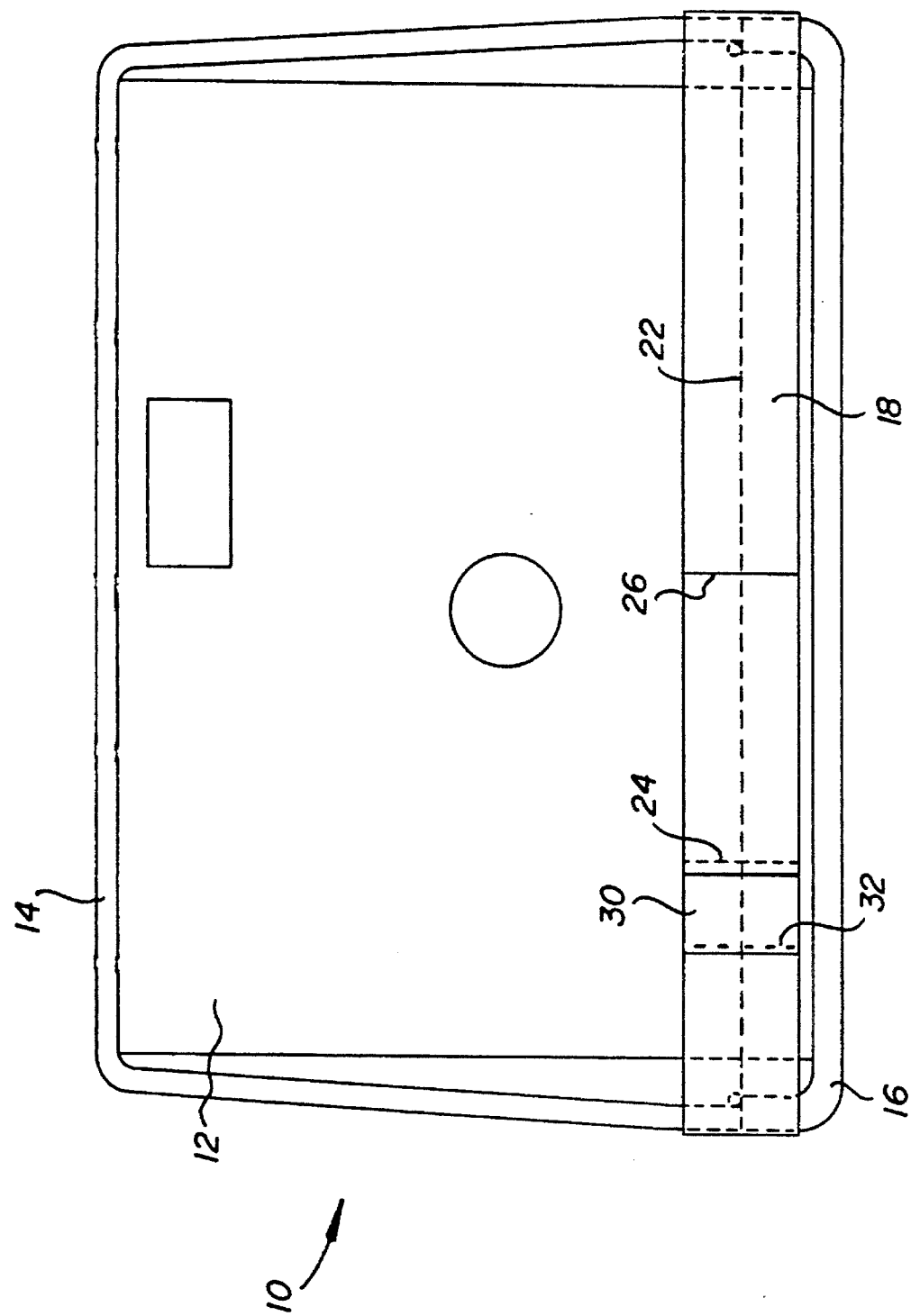
FIG. 1 is a front elevation view of a water-resistant camera housing with a sealing band according to a preferred embodiment of the invention.

Referring now to the drawings, FIG. 1 shows a rigid transparent water-resistant housing 10 for enclosing a camera 12 such as the single-use camera disclosed in U.S. Pat. No. 5,126,772. The housing 10 has a seamless or unitary larger-volume top half 14 and a seamless or unitary smaller-volume bottom half 16. The top half 14 is intended to fit over the camera 12 and couple with the bottom half 16. The camera 12 is seated in the bottom half 16.

Figure 2:
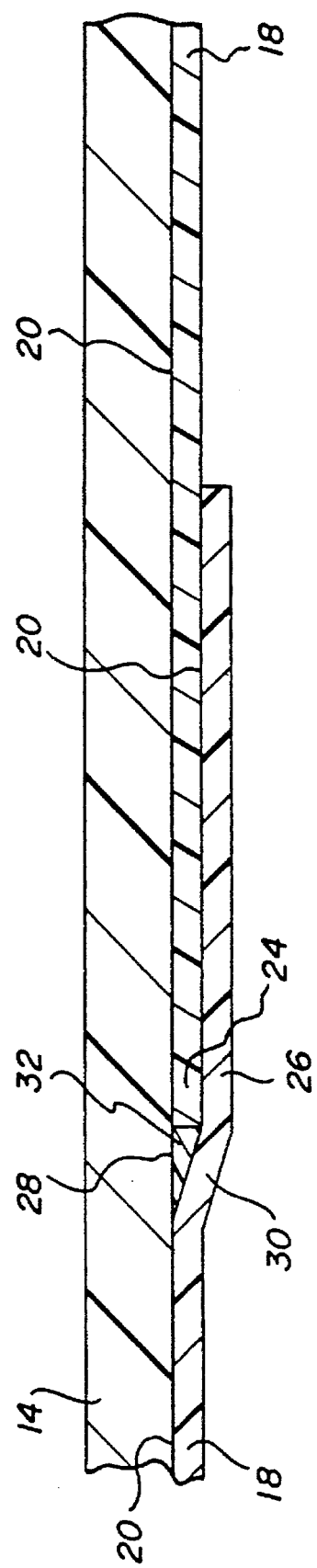
FIG. 2 is a cross-section view of a limited portion of the camera housing and the sealing band.

A waterproof sealing band 18 with an adhesive back 20 is pressure or heat adhered, by means of the adhesive back, to the top and bottom halves 14 and 16 as shown in FIGS. 1 and 2. The sealing band 18 is adhered to the top and bottom halves 14 and 16 substantially completely along a continuous rectangular-shaped separation seam 22 between the top and bottom halves, to provide a water-resistant seal for the seam.

The sealing band 18 has a pair of opposite end portions 24 and 26, shown in FIGS. 1 and 2. The end portion 24 is adhered to the top and bottom halves 14 and 16 along the seam 22. Conversely, the end portion 26 overlaps and is adhered to the end portion 24 to conceal the latter end portion as shown in FIGS. 1 and 2. However, there results a slight gap or open space 28 between the two end portions 24 and 26 adjacent the seam 22. The gap 28 is located beneath a small section 30 of the end portion 26 which is inclined away from the seam 22 to accommodate the thickness of the end portion 24.

A waterproof filler 32 which is a thick viscous liquid substance such as a silicon grease, a glue, or the equivalent occupies the gap 28 to fill every void in the gap, to provide a water-resistant seal in the gap for the seam 22.

The invention has been described with reference to a preferred embodiment. However, it will be appreciated that variations and modifications can be effected by a person of ordinary skill in the art without departing from the scope of the invention.

PARTS LIST 10. water-resistant housing
12. camera
14. top housing half
16. bottom housing half
18. waterproof sealing band
20. adhesive back
22. continuous seam 24. band end portion
26. band end portion
28. gap
30. band section
32. waterproof filler

We claim:

1. A water-resistant camera housing comprising a pair of separable housing sections, and a waterproof sealing band covering a separation seam between said housing sections to provide a water-resistant seal for said seam, is characterized in that:

said sealing band has a pair of opposite end portions one of which overlaps the other but leaves a slight gap between them adjacent said seam; and a waterproof filler occupies said gap to provide a water-resistant seal in the gap for said seam.

2. A water-resistant camera housing as recited in claim 1, wherein said filler is a thick viscous liquid substance that fills every void in the gap.

3. A water-resistant camera housing as recited in claim 1, wherein said filler is a silicon grease substance.

4. A water-resistant camera housing comprising a pair of separable housing sections, and a waterproof sealing band covering a separation seam between said housing sections to provide a water-resistant seal for said seam, is characterized in that:

said sealing band has a pair of opposite end portions one of which extends over and covers the other to conceal the other but leaves a slight open space at said seam; and a waterproof filler occupies said open space to provide a water-resistant seal in the open space for said seam.

* * * * *